Dec. 11, 1934.  B. E. DOHNER  1,983,840

COMPRESSION COUPLING

Filed June 16, 1933

INVENTOR,
Burt E. Dohner,
BY Howard D. Smith,
His ATTORNEY

Patented Dec. 11, 1934

1,983,840

UNITED STATES PATENT OFFICE 1,983,840

COMPRESSION COUPLING

Burt E. Dohner, Oakwood, Ohio

Application June 16, 1933, Serial No. 676,152

3 Claims. (Cl. 285—166)

This invention relates to new and useful improvements in compression couplings.

It is one of the principal objects of my invention to provide a two-piece coupling by which a fitting may be connected to a tube or rod to form a leak-proof seal connection between them under extreme conditions of vibration. Such a coupling lends itself admirably to gasoline, oil and refrigerant lines.

Another object of my invention is to provide in the coupling member a sealing ring constructed of a composition or like material which, when under pressure in the tube end, follows the contour of the tubing at all times to provide a tight seal.

Other important and incidental objects will be brought out in the following specification and particularly set forth in the subjoined claims.

Figure 2:
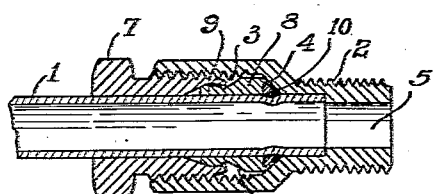
Figure 1:
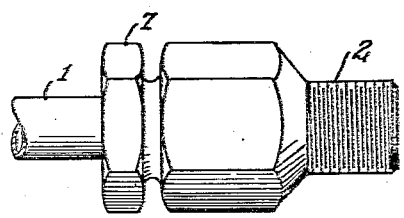
Figure 3:
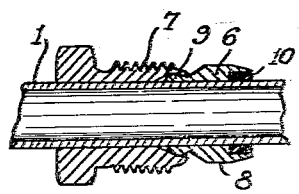
Figure 4:
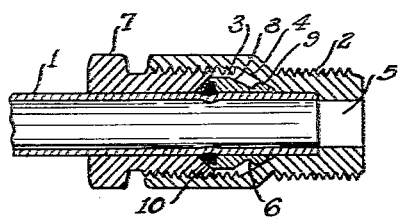
Figure 5:
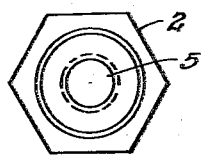

In the accompanying drawing illustrating my invention, Figure 1 is a side elevational view of the coupling assembled. Figure 2 is a longitudinal, sectional view taken through the assembled coupling after it has been tightened up, showing the composition sealing ring in place. Figure 3 is a longitudinal sectional view taken through the coupling member before it is applied to the tube. Figure 4 is a longitudinal sectional view taken through the assembled coupling, showing the coupling member in a reversed position. And Figure 5 is an end view of the assembled coupling.

Referring to the accompanying drawing for a detailed description of the various forms of embodiment of the invention illustrated in the accompanying drawing, the numeral 1 designates a piece of tubing such as a soft metal one that might be employed in a gasoline, oil or refrigerant line. Adapted to be connected to one end of this tubing by my coupling hereinafter to be described, is a fitting 2 formed with a threaded nut receiving bore 3 communicating through a tapered portion 4 with a hole 5.

The coupling which I employ in the present instance for connecting the tube and fitting comprises a compression collar or sleeve 6 and a coupling nut 7 into which said collar is spun or soldered. The sleeve 6 is formed with a large outer rim portion 8, from which the external surface of the collar tapers inwardly at an angle of approximately 45° to an annular ridge portion 9 of less diameter.

Formed in the front end of the rim portion of the coupling sleeve 6 is an annular recess to receive a sealing ring 10 made of soft metal or composition material for compression around the tube 1 when the nut 7 is screwed into the fitting. At this point the coupling becomes a three piece one, with the ridge 9 on the compression sleeve 6 biting into the metal of the nut to prevent it from working loose. The sealing ring 10 at the same time is compressed to small cross section, following the contour of the tube and tapered wall 4 of the fitting at all times to provide a tight seal between them. Such a seal makes the connection leak-proof under the most extreme conditions of vibration.

In Figure 4 I have shown the position of the compression sleeve 6 reversed. In such a position of the compression sleeve, the sealing ring is within the tapered portion of the nut 7. In either position, the sealing ring co-operates with the ridge portion 9 of the compression sleeve in forming a leak-proof connection between the fitting and the tube, and one that will not become loose under vibration.

Having described my invention, I claim:

1. A coupling for connecting a fitting to a cylindrical member, a compression nut applied to the cylindrical member for entrance into the fitting, a compression sleeve carried by the inner end of the nut, a ridge on said sleeve, and a sealing ring within the compression sleeve for co-operation with the ridge in providing a leak-proof connection, under vibration, between the cylindrical member and fitting when the nut is screwed into the fitting.

2. A coupling for connecting a fitting to a cylindrical member, a compression nut applied to the cylindrical member for entrance into the fitting, a compression sleeve carried by the inner end of the nut, a small ridge on the inner portion of said sleeve, and a sealing ring within the outer portion of said sleeve for co-operation with the ridge in providing a leak-proof connection, under vibration, between the cylindrical member and fitting when the nut is screwed into the latter.

3. A coupling for connecting a fitting to a cylindrical member, a compression nut applied to the cylindrical member for entrance into the fitting, a compression sleeve carried by the inner end of the nut, a rim portion of large diameter at the front end of the sleeve, a ridge of small diameter on the rear portion of the sleeve, to which the wall of the latter inclines from said rim portion, the rim portion of the sleeve being formed with a recess, and a sealing ring of plastic material in said recess for the purpose specified.

BURT E. DOHNER.